(12) United States Patent
Nelluri

(10) Patent No.: US 11,363,106 B2
(45) Date of Patent: Jun. 14, 2022

(54) ELECTRONIC SYSTEM FOR COMBINATION OF TEMPORAL RESOURCE ACTIVITY DATA AND RESOURCE TRANSMISSION

(71) Applicant: BANK OF AMERICA CORPORATION, Charlotte, NC (US)

(72) Inventor: Govinda Rajulu Nelluri, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 163 days.

(21) Appl. No.: 16/883,432

(22) Filed: May 26, 2020

(65) Prior Publication Data

US 2021/0377350 A1 Dec. 2, 2021

(51) Int. Cl.
| | | |
|---|---|---|
| H04L 67/51 | (2022.01) | |
| G06F 16/22 | (2019.01) | |
| H04L 67/10 | (2022.01) | |
| H04L 9/40 | (2022.01) | |
| H04W 12/06 | (2021.01) | |
| G06Q 30/00 | (2012.01) | |
| G06Q 20/10 | (2012.01) | |
| G06Q 20/40 | (2012.01) | |
| G06Q 40/02 | (2012.01) | |
| G06Q 20/18 | (2012.01) | |

(52) U.S. Cl.
CPC .......... *H04L 67/16* (2013.01); *G06F 16/2228* (2019.01); *G06Q 20/1085* (2013.01); *G06Q 20/18* (2013.01); *G06Q 20/40* (2013.01); *G06Q 30/0185* (2013.01); *G06Q 40/02* (2013.01); *H04L 63/0876* (2013.01); *H04L 67/10* (2013.01); *H04W 12/06* (2013.01)

(58) Field of Classification Search
CPC ..... H04L 67/16; H04L 67/10; H04L 63/0876; H04W 12/06; G06F 16/2228; G06Q 20/1085; G06Q 20/18; G06Q 20/40; G06Q 30/0185; G06Q 40/02
See application file for complete search history.

(56) References Cited

U.S. PATENT DOCUMENTS

| | | |
|---|---|---|
| 5,444,616 A | 8/1995 | Nair et al. |
| 5,991,758 A | 11/1999 | Ellard |
| 6,260,024 B1 | 7/2001 | Shkedy |

(Continued)

*Primary Examiner* — Kristie D Shingles
(74) *Attorney, Agent, or Firm* — Moore & Van Allen PLLC; Vaidehl Bachoti

(57) ABSTRACT

Embodiments of the present invention relate to, in general, combination of temporal resource activity data and resource transmission. Typically, a system configured to concatenate time dependent sequential activity data structures such that resource transmission for an impending resource activity may be performed at an antecedent resource activity associated with the sequential activity data structures, is provided. In some embodiments, based on analyzing a trigger signal, the system is configured to identify a first resource activity initiated by the user. The system may then modify the first resource activity at the first networked device, in order to link a second resource activity with the first resource activity such that the second resource activity is initiated concurrently with the first resource activity prior to the second time interval associated with the second resource activity.

19 Claims, 5 Drawing Sheets

(56) References Cited

U.S. PATENT DOCUMENTS

| | | | |
|---|---|---|---|
| 6,266,649 | B1 | 7/2001 | Linden et al. |
| 7,346,575 | B1 | 3/2008 | Ahles et al. |
| 7,974,873 | B2 | 7/2011 | Simmons et al. |
| 8,001,044 | B2 | 8/2011 | Davis |
| 8,229,458 | B2 | 7/2012 | Busch |
| 8,560,395 | B2 | 10/2013 | Walker et al. |
| 10,410,272 | B1 | 9/2019 | Johnson et al. |
| 10,482,442 | B2 | 11/2019 | Priebatsch |
| 2004/0249497 | A1 | 12/2004 | Saigh et al. |
| 2005/0255861 | A1 | 11/2005 | Wilson et al. |
| 2007/0281689 | A1 | 12/2007 | Altman et al. |
| 2009/0100037 | A1 | 4/2009 | Scheibe |
| 2010/0114654 | A1 | 5/2010 | Lukose et al. |
| 2011/0125566 | A1 | 5/2011 | McLaughlin et al. |
| 2011/0218839 | A1 | 9/2011 | Shamaiengar |
| 2013/0030955 | A1 | 1/2013 | David |
| 2013/0178233 | A1 | 7/2013 | McCoy et al. |
| 2013/0204737 | A1 | 8/2013 | Agarwal et al. |
| 2015/0120600 | A1 | 4/2015 | Luwang et al. |
| 2015/0135214 | A1* | 5/2015 | Reisman ............ H04N 21/4113 725/37 |
| 2019/0044949 | A1* | 2/2019 | Bartfai-Walcott ........................... H04W 12/009 |
| 2019/0147708 | A1 | 5/2019 | Monaco et al. |
| 2021/0144517 | A1* | 5/2021 | Guim Bernat ........ H04L 9/3213 |

* cited by examiner

ELECTRONIC SYSTEM FOR COMBINATION OF TEMPORAL RESOURCE ACTIVITY DATA AND RESOURCE TRANSMISSION

BACKGROUND

Networked devices, such as computer terminals, are commonly used by individuals to perform a variety of activities. An activity may be initiated by a networked device. However, in conventional systems, once initiated, the data structures of the activity cannot be modified. Any alteration requires abandoning the existing activity and initiating yet another activity. This requires increased processing capacity and may be detrimental to communication speeds due to the large number of activities initiated. Moreover, conventional systems lack the ability to proactively combine disparate activities, much less activities that are associated with distinct time intervals. A needs exists for systems and methods for improving the functionality and processing capability of networked devices for dynamically performing activities.

The present invention addresses the foregoing needs and also provides improvement to technology by improving the functionality of and processing capability of networked devices, by configuring the networked devices for proactive combination of temporal resource activity data and dynamic transmission of resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the invention relate to systems, computer-implemented methods, and computer program products (e.g., computer readable program code, and/or non-transitory tangible computer readable media) for combination of temporal resource activity data and resource transmission, wherein the invention is configured to concatenate time dependent sequential activity data structures such that resource transmission for an impending resource activity may be performed at an antecedent resource activity associated with the sequential activity data structures. Typically, in various embodiments of the invention, the systems, methods, and computer program products are configured to: receive, via a first operative communication channel, a first trigger signal from a first networked device of the plurality of networked devices at a first time interval, wherein the first trigger signal comprises a first activity data structure; based on analyzing the trigger signal, identify a first resource activity initiated by a user at the first time interval, wherein the first resource activity is associated with a user resource; determine a second resource activity associated with the user such that (i) the second resource activity comprises a user *nexus* with the first resource activity, and (ii) the second resource activity is associated with a second time interval succeeding the first time interval; construct a second activity data structure associated with the second resource activity associated with the second time interval; construct a linked temporal activity data structure comprising the second activity data structure linked with the first activity data structure; transmit, via the first operative communication channel, a second trigger signal comprising the linked temporal activity data structure to the first networked device, wherein the second trigger signal is structured to modify the first resource activity at the first networked device to link the second resource activity with the first resource activity such that the second resource activity is initiated concurrently with the first resource activity prior to the second time interval associated with the second resource activity; initiate, via the first networked device, at least one resource transfer for performing the first resource activity and the second resource activity, wherein the at least one resource transfer is initiated prior to the second time interval associated with the second resource activity; and transmit, a control signal to a mobile device associated with the user based on completion of the first resource activity and the second resource activity.

In some embodiments, or in combination with any of the embodiments herein, transmitting the second trigger signal to the first networked device further comprises: transmitting, a third trigger signal comprising the linked temporal activity data structure to a user device associated with the user, wherein the second trigger signal is structured to cause the user device to display a user interface associated with the first resource activity and the second resource activity; receive, via the user device, at least one user input associated with authorizing the second user activity; and in response to receiving the at least one user input authorizing the second user activity, transmitting the second trigger signal to the first networked device.

In some embodiments, or in combination with any of the embodiments herein, receiving the at least one user input associated with authorizing the second user activity: receiving, via the user device, a change user input associated with modifying the second user activity; and in response to receiving the change user input, modify the linked temporal activity data structure; and wherein the second trigger signal comprises the modified linked temporal activity data structure.

In some embodiments, or in combination with any of the embodiments herein, transmitting the second trigger signal to the first networked device further comprises: presenting the linked temporal activity data structure associated with the first resource activity and the second resource activity, wherein presenting the network activity channel comprises: (i) modifying, dynamically, an existing presentation associated with the first resource activity on a display device of the first networked device by inserting a presentation associated with the second activity data structure of the second resource activity; and (ii) configuring the first networked device for performing the at least one resource transfer associated with the first resource activity and the second resource activity.

In some embodiments, or in combination with any of the embodiments herein, determining that the second resource activity comprises the user *nexus* with the first resource activity further comprises: determining a geographic location of the first networked device; constructing a geofence associated with the geographic location of the first networked device, wherein the geofence is associated with a geographic area within a predetermined distance range from the geographic location of the first networked device; identifying a second resource activity associated with the user; and in response to at least determining that a geographic location of the second resource activity is within the geofence, determining that the second resource activity comprises the user *nexus* with the first resource activity.

In some embodiments, or in combination with any of the embodiments herein, determining that the second resource activity comprises the user *nexus* with the first resource activity further comprises: analyzing a prior user activity log associated with the user; identifying a prior first resource activity associated with the first networked device in the user activity log; identifying a prior second resource activity associated from the user activity log; and in response to at least determining that the prior second resource activity occurred at a time within a predetermined time interval from the prior first resource activity, (i) selecting the prior second resource activity as the second resource activity, and (ii) determining that the second resource activity comprises the user *nexus* with the first resource activity.

In some embodiments, or in combination with any of the embodiments herein, determining that the second resource activity comprises the user *nexus* with the first resource activity further comprises: identifying a future scheduled activity associated with the user; and in response to at least determining that the future scheduled activity is scheduled for a time within a predetermined time interval from the first resource activity, (i) selecting the future scheduled activity as the second resource activity, and (ii) determining that the second resource activity comprises the user *nexus* with the first resource activity.

In some embodiments, or in combination with any of the embodiments herein, determining the second resource activity associated with the user further comprises: determining an activity entity system associated with the second resource activity; determining, via operative communication with the activity entity system, an activity availability and an activity resource value associated with the second activity data; determining that (i) the activity availability is above a predetermined threshold, and (ii) the activity resource value is below a resource availability value associated with the user; and wherein the second activity data structure associated with the second resource activity comprises the activity resource value.

In some embodiments, or in combination with any of the embodiments herein, the invention is further structured to: receive a user input associated with authorizing the second user activity at the user device; and based on at least the user input, concurrently perform (i) the first resource activity and (ii) the second resource activity at the first networked device prior to the second time interval associated with the second resource activity.

In some embodiments, or in combination with any of the embodiments herein, the at least one resource transfer comprises a first resource transfer associated with the first resource activity and a second resource transfer associated with the second resource activity. Here, performing (i) the first resource activity and (ii) the second resource activity comprises: initiating, concurrently, (i) transmission of the first resource transfer associated with the first resource activity to a first entity resource associated with the first networked device, and (ii) transmission of the second resource transfer associated with the second resource activity to a second entity resource not associated with the first networked device, without requiring initiation of another resource activity.

In some embodiments, or in combination with any of the embodiments herein, receiving the user input associated with authorizing the second user activity further comprises: accessing a mobile device security identifier stored in the user device; validating user authentication credentials received at the user device from the user; wherein the (i) the first resource activity and (ii) the second resource activity is performed at the first networked device based on at least (i) successful validation of the user authentication credentials and (ii) the mobile device security identifier.

In some embodiments, or in combination with any of the embodiments herein, the first networked device is a transaction terminal, also referred to as a computer terminal.

In some embodiments, or in combination with any of the embodiments herein, the invention is further structured to determine one or more third resource activities associated with the user such that (i) each of the one or more third resource activities comprises a user *nexus* with the first resource activity, and (ii) each of the one or more third resource activities is associated with a third time interval succeeding the first time interval; construct, for the one or more third resource activities, one or more third activity data structures. Here, constructing the linked temporal activity data structure comprises the one or more third activity data structures linked with the first activity data structure. In this regard, the second trigger signal is structured to modify the first resource activity at the first networked device to link the one or more third resource activities with the first resource activity such that each of the one or more third resource activities are initiated concurrently with the first resource activity prior to the third time interval associated with the third resource activity. Here, initiating the at least one resource transfer comprises initiating the at least one resource transfer for performing the first resource activity, the second resource activity, and one or more third resource activities. The invention is further structured to transmit, a control signal to a mobile device associated with the user based on completion of the one or more third resource activities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

Figure 1:
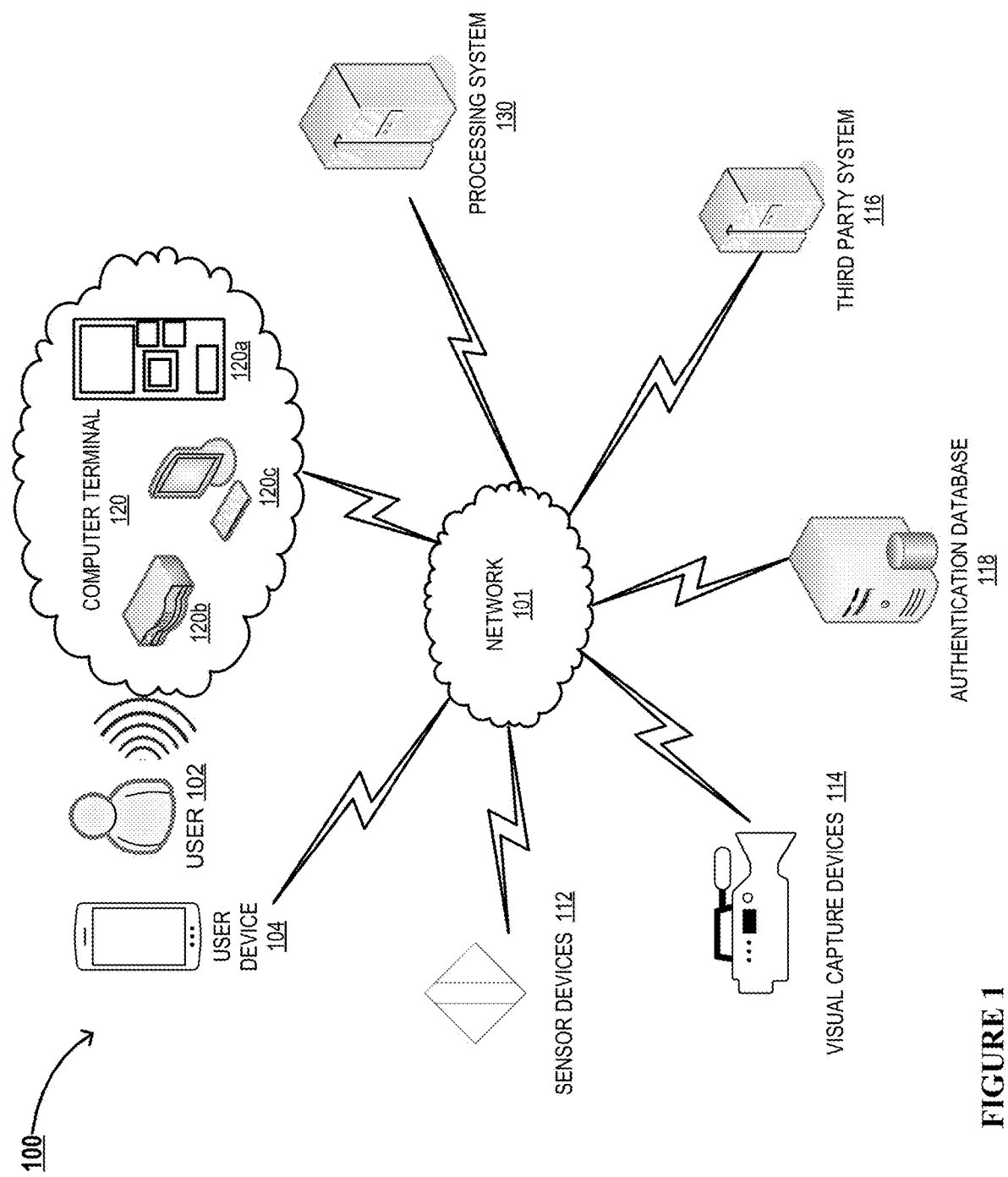
FIG. 1 illustrates a block network architecture diagram illustrating a system environment 100 for combination of temporal resource activity data and resource transmission, in accordance with some embodiments of the invention.

DETAILED DESCRIPTION OF EMBODIMENTS
OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a network connected resource transfer platform, and particularly geolocation systems and devices. As such, the entity may be any institution, group, association, financial institution, merchant, establishment, company, union, authority or the like. Typically, the entity is associated with one or more computer terminals (also referred to as networked devices in some instances). Typically, the entity owns the computer terminals, operates computer terminals, provides the computer terminal devices, facilitates services associated with the computer terminals, and/or is otherwise associated with the computer terminals.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

The term "computer terminal" or "user activity terminal" as used herein may refer to one or more electronic devices that facilitate one or more user activities or transactions. In some embodiments, the computer terminal may refer to any device (or networked device) that is configured to operatively communicate with a mobile device via a network. In some embodiments, the computer terminal is configured to facilitate performance of one or more user activities by establishing an "interactive session" between a user and the computer terminal, and more specifically between the user's mobile device and the computer terminal (e.g., via a secure wireless communication channel). As such, the terms "user activity", "network activity" or "user transaction" or simply "activity" may refer to financial or non-financial activities, tasks, events or actions. In some embodiments a computer terminal refers to one or more devices that facilitate execution of financial transactions or activities. In this regard, in some embodiments, the computer terminals may be Point of sale (POS) terminals/devices. In some embodiments, the computer terminals may be Automated Teller Machines (ATMs), vending machines, checkout registers, ticket vending machines, automated retail transaction devices, banking terminals in a financial institution, financial institution servers, merchant servers, other computing devices that involve financial user activities or transactions in one form or another, or may comprise technology elements and/or functionality of one or more aforementioned devices, or a suitable combination of the aforementioned devices/apparatuses. In some embodiments the computer terminal refers to devices that facilitate execution of non-financial user activities or transactions, for example, smart devices (e.g., secure doors with authentication features, smart learning walls, smart televisions, tablets, smart automobiles, and the like), check-in terminals for various industries, for example: hospitality, travel, and the like, information kiosks and other computer terminals that do not involve a user performing a financial transaction via the computer terminal. In some embodiments the computer terminals enable execution of both financial and non-financial transactions/activities (e.g., a computer terminal may be a suitable combination of any of the aforementioned terminal devices with respect to their features, design and/or function). That said, computer terminals may also refer to portable devices that facilitate financial and/or non-financial transactions, such as personal computers, laptop computers, tablet computers, smartphones, wearable devices, personal digital assistants (PDAs), and other computing devices. In some embodiments, the computer terminals may be owned, operated and/or otherwise associated entities and are installed at suitable locations, such that the user can travel to the location of the computer terminal to perform user activities or execute transactions. In some embodiments, the computer terminals may be owned, operated and/or otherwise associated with the user. In embodiments described herein, performing a user activity or transaction may refer to the initiation, stages during the processing, or completion of a transaction. The computer terminal of the present invention is interactive and is configured to communicate with a user using visual, audio or other means, either directly (e.g., using display devices of the computer terminal) or via suitable devices (e.g., via a user mobile device).

Typically, the user may provide authentication credentials for conducting user activities or transactions at the computer terminal. In some embodiments, computer terminals require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with the individual computer terminal and/or the individual card/account provided for authentication.

A "user activity", a "network activity", a "resource transfer" or "resource distribution" or a transaction refers to any communication between a user and the financial institution or other entity monitoring the user's activities to transfer funds for the purchasing or selling of a product, financial activities or non-financial activities of a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device (e.g. a mobile cellular device), a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

As alluded to previously, activities may be initiated by a networked device. However, in conventional systems, once initiated, the data structures of the activity cannot be modified. For example, a first resource transfer (e.g., transaction, payment, etc.) may be initiated at a networked device (e.g., ATM, point of sale terminal, etc.) by a user. The first resource transfer is processed by transmitting data structures corresponding to a first resource value (e.g., a payment) from a first resource (e.g., an account associated with the user) to a second resource (e.g., an account associated with another entity such as a merchant). Once the first resource transfer is initiated in conventional systems, it typically cannot be modified in situ. As another example, a user may initiate an activity of a video conference. The conference is commenced by first creating data structures corresponding to the communication and access configuration resources (e.g., permissions) of the video conference, and transmitting them to one or more other networked devices associated with the participants of the video conference, after which the creating data structures corresponding to the communication and access configurations (e.g., permissions) of the video conference typically cannot be modified without interrupting the conference set-up process. Here, any alteration to the initiated user activity, even if possible, may require abandoning the already initiated activity and initiating yet another activity. For example, conventional systems may need to abandon the existing resource transfer and initiate a new resource transfer (e.g., new payment transfer, new video conference, etc.). Sudden abandoning of the initiated activities may cause systems to freeze resulting in undesirable downtime. Moreover, this requires increased processing capacity and may be detrimental to communication speeds due to the additional number of activities required to be initiated in place of the abandoned activities. Moreover, conventional systems lack the ability to proactively combine disparate activities, much less activities that are associated with distinct time intervals, hence further requiring an increased number of activities to be processed and transmitted which in turn requires even more processing and communication capability. A needs exists for systems and methods for improving the functionality and processing capability of networked devices for dynamically performing activities.

The present invention addresses the foregoing needs and also provides improvement to technology by improving the functionality of and processing capability of networked devices, by configuring the networked devices for proactive combination of temporal resource activity data and dynamic transmission of resources. The present invention provides a first improvement to conventional systems by configuring networked devices to dynamically modify initiated user activities, without requiring abandonment of the initiated activity. As a second improvement, upon initiation of a first activity, the present invention is structured to proactively, and in real time, (i) determine a second activity (also referred to as an auxiliary activity) associated with the first activity, and (ii) dynamically modify the first activity to link the second activity therewith such that the first activity and second activity are processed together, which is typically not possible in the absence of the present invention. As a third improvement provided by the present invention, the present invention is not only configured to dynamically modify an initiated first activity by concatenating/linking it with an associated second activity, the present invention is also structured to dynamically modify the initiated first activity using a time dependent second activity, such that an impending second resource activity associated with (e.g., scheduled for) a predetermined time in the future may still be concatenated/linked with the first activity occurring in the present.

For example, the system may determine that the user has initiated a first resource activity of a purchase transaction at a point of sale terminal (first networked device) associated with a first entity (e.g., first store). Here, the system may, dynamically and in real-time, modify the purchase transaction at the first networked device, in order to link a second resource activity associated with a second entity that is associated with a time in the future, such as initiating a transportation for the user such as a cab with the transportation scheduled to account after a predetermined time interval, purchase of a food item from a second entity (e.g., second store) scheduled for pick-up at a time interval in the future, such that the user can pay for both the first and second activities together at the point of sale terminal in an antecedent matter (e.g., beforehand), e.g., based on receiving user approval.

As another example, the system may determine that the user seeks to visit a sporting event based on a first activity trigger signal of purchase of entry tickets. Here, the system may analyze the first activity information included in the trigger signal such as the time and location of the event, distance from user's residence/work location, etc., and subsequently determine that the user would need to perform a second/auxiliary activity of purchasing a parking ticket for parking the user's vehicle at the time of the event. The system may automatically and dynamically modify the first activity to include the second activity, and process both of them.

As another example, as discussed above, based on determining that the user has initiated a first activity of a video conference, the system may identify an additional second/ auxiliary activity of configuring network devices of the participants (e.g., user laptop computers), such that the network devices of the participants activate predetermined audio/video connectivity (e.g., activate display of predetermined interfaces (e.g., slideshows), activate screen sharing, mute speakers, etc.) after a certain time interval after the video conference has commenced. The system may then dynamically modify the data structures corresponding to the communication and access configuration resources of the video conference to include that of the second activity, and transmit them to one or more other networked devices associated with the participants of the video conference.

Referring to FIG. 1, a block diagram illustrating a system environment 100 configured for providing an interactive user activity terminal configured for combination of temporal resource activity data and resource transmission, is illustrated, in accordance with some embodiments of the invention. As illustrated, the system environment 100 may comprise a computer terminal 120 (also referred to as a user activity terminal 120, a first networked device, etc.), in operative communication with one or more user devices 104 associated with a user 102, a processing system 130, one or more sensor devices 112, one or more visual capture devices 114, an authentication database 118, a third party system 116 and/or other systems/devices not illustrated herein, via a network 101. As such, the computer terminal 120 is configured such that the user 102 may perform one or more user activities or transactions by utilizing the computer terminal directly (for example, by physically operating the computer terminal 120 and its interfaces, using input/output devices of the terminal 120, using audio commands, using physical gestures, and the like) and/or via communication between the user device 104 and the terminal 120 (for example, by establishing operative communication channels between the user device 104 and the terminal 120 via a wireless network and interacting with the terminal 120 via the devices and interfaces of the user device 104).

Typically, the processing system 130 and the authentication database 118 are in electronic communication with the computer terminal 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the computer terminal 120). In this regard, the wireless communication channel may further comprise near field communication (NFC), communication via radio waves, communication through the internet, communication via electromagnetic waves and the like.

As discussed previously, the computer terminal 120 is configured to facilitate performance of user activities, and is configured to provide real-time interactive sessions for the user 102. In some embodiments, the computer terminal 120 or the user activity terminal 120 is point of sale terminal 120b (also referred to as a transaction terminal) configured for uniquely facilitating user activities in accordance with some embodiments. In some embodiments, the computer terminal 120 is an ATM 120a, a computing device 120c, a vending machine, a kiosk, and/or another device, or a suitable combination of the aforementioned devices, that is configured to facilitate the user activity. The components of the computer terminal 120, its features and functions will be described in detail through this disclosure and with respect to FIG. 2, in particular.

In some embodiments, the computer terminal 120 receives signals, images and other data captured by the sensor devices 112 and/or the visual capture devices 114, during its execution of user activities. In this regard, in some embodiments, the computer terminal 120 communicates with, transmits instructions, and/or receives signals from the sensor devices 112 and the visual capture devices 114 directly, via the network 101, typically, in real-time. In some embodiments, the computer terminal 120 communicates with the sensor devices 112 and the visual capture devices 114 through the processing system 130, typically, in real-time. Analyzing the signals received from the sensor devices 112 and the visual capture devices 114 typically enables the computer terminal 120, the processing system 130, or the devices 112 and 114 themselves, to determine user location, determine trigger events (e.g., user approach to the terminal 120, retrieve/identify user authentication credentials from the user and/or the user device, establishing communication with the user device in the vicinity of the terminal, determination of whether the user device comprises an integrated resource transfer application, and the like), capture one or more parameters associated with the environment or physical location of the computer terminal 120, and the like.

In some embodiments, the sensor devices 112 are position sensors configured to sense or determine the position and/or location of the user 102, other individuals, objects/devices, or entities. As such, the sensor devices 112 may determine an absolute positon (for example, location/positioning coordinates) or a relative position (for example, with respect to the position of the terminal 120, with respect to position of the user or another individual, with respect to the sensor 112 itself or a predetermined object and the like) of the user, individual or object. Here, in some embodiments, the sensor devices 112 are proximity sensors that are configured to determine the presence of the user or object within a predetermined proximity area. These sensor devices 112 may be contact type sensors that determine the presence of the user or object based on contact, or non-contact type sensors that detect distant users or objects. Typically, the sensor devices 112 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor 112. The return signal/wave is then converted to an electric signal by a second transducer of the sensor. This electric signal may be analyzed, in real-time, by the sensor 112, the terminal 120, and/or the processing system 130, to determine the location of the user/object and/or track movement of the user/object. Here, the sensor 112 may be configured to perform modulation, demodulation, amplification and output switching of the proximity and return signals.

For example, in some embodiments, the sensor devices 112 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 112 comprise optical sensors or photoelectric sensors that are configured to transmit a proximity signal comprising electromagnetic waves, and specifically light waves (for example, infrared waves with frequencies in the range of about 600 GHz to 430 THz, such as infrared or visible red waves, laser waves in the visible or infrared frequency range, and the like) and are further configured to receive a return signal, either in the form of a reflection signal or interruption of the light proximity signal at receiver associated with the sensor 112, which is then converted to an electric signal for analysis. As yet another example, the sensor devices 112 comprise inductive proximity sensors and inductive position sensors for determining the presence and position, respectively, of users and objects, which generate an induction loop to thereby produce a proximity signal in the form or a magnetic field. The presence of users or objects varies the current flowing through the loop which facilitates determination of presence of users or objects. In some embodiments, the sensor devices 112 comprise sensor devices provided in the user device 104, such as, biometric sensors (for example, fingerprint scanner of a mobile phone, monitor of a wearable user device, and the like), location sensors (for example, GPS devices, accelerometers, and the like), visual capture devices/cameras, facial recognition devices, devices for capturing user gestures (for example, a touch screen) and other sensing devices of the user device 104. Here, the terminal 120 and/or the processing system 130 may transmit control signals to the user device to cause the sensing devices of the user device 104 to capture one or more parameters and/or to transmit one or more captured parameters.

The visual capture devices 114 typically comprise cameras and other audio, video and image capture devices. These visual capture devices 114 are configured to capture images and/or video streams, typically in real-time, of a predetermined proximity area. The images and/or video streams may be analyzed by the computer terminal 120, the processing system 130 and/or the capture devices 114, to determine the presence and position of the user, other individuals or objects and their movement in the proximity area. Although described separately, it is understood that the visual capture devices 114 may be associated with the sensor devices 112. As such, sensors or sensor devices, as alluded to herein, may refer to the various sensor devices described herein and the visual/image capture devices described herein.

As alluded to previously, the processing system 130 is in operative communication with the computer terminal 120. In some embodiments, processing system 130 is configured to transmit control instructions that are configured to cause the computer terminal 120, the user device 104, the sensor device 112 and/or the visual capture devices 114 to perform at least a portion of the steps associated with one or more activities. The processing system 130 may be associated with the same entity as the computer terminal 120 or may be associated with another entity. The structure and components of the processing system 130 is described in detail with respect to FIG. 3. The computer terminal 120 may further communicate with the third party system 116 and/or the authentication database 118, either directly or via the processing system 130. The authentication database 118 may comprise authentication credentials associated with the user. The processing system 130 and/or the computer terminal 120 may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. As discussed previously, in some embodiments, the computer terminals 120 of the present invention are configured to establish operative communication channels with the user device 104 such that, the user 102 may perform one or more user activities, either entirely or in part, at the terminal 120 by interacting with the user device 104. The user device 104 is described in detail with respect to FIG. 4.

Figure 2:
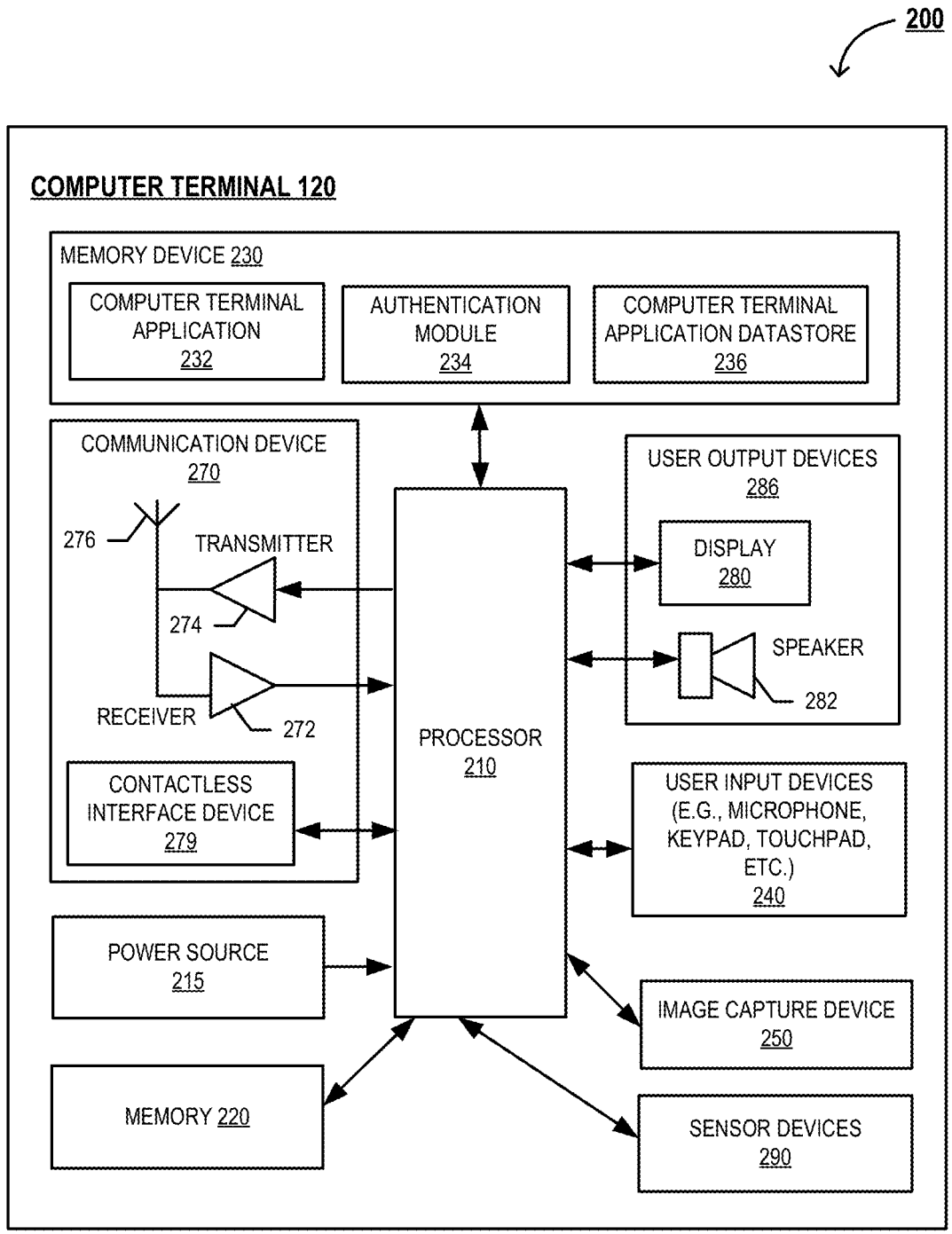
FIG. 2 illustrates a block diagram 200 of a computer terminal system, in accordance with some embodiments of the invention.

FIG. 2, illustrates a block diagram 200 of the computer terminal 120 system, in accordance with some embodiments of the invention. As discussed previously, the computer terminal 120 is configured to facilitate performance of user activities, and is configured to provide or facilitate real-time interactive sessions for the user 102, either on the mobile device of the user or on the terminal itself, using one or more communication channels established via the network 101. The computer terminal 120 typically includes a processing device or a processor 210, memory device 230, storage memory 220 or datastore 220, and a communication device 270. As such, the computer terminal 120, and the processor 210 is particular, is configured to perform at least a portion of the steps of the embodiments described herein, either based on executing computer readable instructions stored in the memory device 230, and/or based on receiving instructions, indications, or signals from other systems and devices such as the processing system 130, the user device 104, sensor devices 112, visual capture devices 114, the user 102, and/or other systems. In some embodiments, the processing system 130 is configured to transmit control instructions to, and cause the processing device 210 to perform one or more steps of the embodiments presented herein. For example, the processing system 130 may detect a trigger event and transmit an indication to the processing device 210. In response to receiving the control signal from the system 130, the processing device 210 may initiate a presentation of environment parameters.

As discussed previously, "computer terminal" or "user activity terminal" as used herein may refer to one or more electronic devices that facilitate one or more user activities or transactions. In some embodiments, the computer terminal may refer to any device (or networked device) that is configured to operatively communicate with a mobile device via a network. Typically, a computer terminal is configured to facilitate performance of one or more user activities by establishing an "interactive session" between a user and the computer terminal, and more specifically between the user's mobile device and the computer terminal (e.g., via a secure wireless communication channel). In some embodiments the computer terminal refers to devices that facilitate execution of non-financial user activities or transactions, for example, smart devices such as, secure doors with authentication features, smart learning walls, smart televisions, tablets, smart automobiles, and the like, mobile devices, check-in terminals for various industries, Automated Teller Machines (ATMs), Point of sale (POS) devices, vending machines, checkout registers, ticket vending machines, automated retail transaction devices, banking terminals in a financial institution, financial institution servers, merchant servers, sensors, transmitter devices, and other devices that involve user activities or transactions in one form or another, or may comprise technology elements and/or functionality of one or more aforementioned devices, or a suitable combination of the aforementioned devices/apparatuses. In some embodiments the computer terminals enable execution of both financial and non-financial transactions/activities (e.g., a computer terminal may be a suitable combination of any of the aforementioned terminal devices with respect to their features, design and/or function).

The processing device 210 may generally refer to a device or combination of devices having circuitry used for implementing the communication and/or logic functions of the computer terminal 120. For example, the processing device 210 may include a control unit, a digital signal processor device, a microprocessor device, and various analog-to-digital converters, digital-to-analog converters, and other support circuits and/or combinations of the foregoing. Control and signal processing functions of the computer terminal 120 may be allocated between these processing devices according to their respective capabilities.

The computer terminal 120 may further include various components/devices in operative communication with and/ or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the computer terminal 120, such as an image capture device 250, sensor devices 290, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises a computer terminal application 232 (also referred to as a terminal application), an authentication module 234, a computer terminal application datastore 236 stored therein. In some embodiments, the authentication module 234 is integral with the computer terminal application 232. In some embodiments, the computer terminal applications 232 and/or the authentication module 234 may be executable to initiate, perform, complete, and/or facilitate one or more portions of any embodiment described and/or contemplated herein, either independently or in response to receiving control instructions from the processing system 130. In some embodiments, the computer terminal application/module 232 comprises computer readable instructions stored in the memory device 230, which when executed by the processing device 210, are configured to cause the processing device 210 to perform one or more steps of the embodiments presented herein, and/or cause the processing device to transmit control instructions to other components of the terminal 120 and other devices/systems in the network 101 to cause them to perform the steps. Generally, the computer terminal application 232 is executable to receive activity instructions from the user and perform user activities and the various steps described herein. In some embodiments, the computer terminal application 232 comprises a personal digital assistant for interfacing with the user at the terminal. The computer terminal application 232 may be coupled to a computer terminal application datastore 236 for storing application data as the user activity is being performed. The computer terminal application datastore 236 may store the application data temporarily for the predetermined duration of the execution of the activity (such as a memory buffer, or cache memory), or permanently.

The computer terminal 120 may require users to identify and/or authenticate themselves before the computer terminal 120 may initiate, perform, complete, and/or facilitate a user activity. For example, in some embodiments, the computer terminal 120 is configured (and/or the computer terminal application 232 is executable) to authenticate a computer terminal user based at least partially on a computer terminal debit card, smart card, token (e.g., USB token, etc.), username, password, PIN, biometric information, and/or one or more other credentials that the user presents to the computer terminal 120. Additionally or alternatively, in some embodiments, the computer terminal 120 is configured to authenticate a user by using one-, two-, or multi-factor authentication. For example, in some embodiments, the computer terminal 120 requires two-factor authentication, such that the user must provide a valid debit card and enter the correct PIN associated with the debit card in order to authenticate the user to the computer terminal 120. However, either alternatively or in addition to the aforementioned authentication features, the computer terminal 120 may require biometric authentication of the user 102 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices 286 (for example, based on determining the desired authorization level for the user activity), activating pertinent sensors and devices for receipt of the credentials (sensor devices 290/image capture devices 250 for biometric credentials, card reader devices 240 for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processing device 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the computer terminal 120, between the computer terminal 120, particularly the processing device 210, and other devices or systems, such as the processing system 130, the user device 104, the authentication database 118, the third party system 116, and the like. In this regard, the communication interface 270 comprises a transmitter 274, a receiver 272, a broadcasting device 276 to transmit and receive signals from corresponding devices via a suitable transmission medium or a communication channel. In some embodiments, the computer terminal 120 is configured to be coupled/connected to other devices and systems via wired communication channels. In other embodiments, the computer terminal 120 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the computer terminal 120 may include a transceiver, i.e., one or more antennas and and/or other electronic circuitry, devices, and software, for receiving data when a device is held close to or tapped at a suitable location of the computer terminal 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the computer terminal 120 within a distance of up to approximately 25 cm, and from 0-20 cm, such as from 0-15 cm, and 0-10 cm, and the like.

Establishing the communication channels may also include signaling information in accordance with the air interface standard of the applicable cellular system of the wireless telephone network that may be part of the network 101. In this regard, the computer terminal 120 may be configured to operate with one or more air interface standards, communication protocols, modulation types, and access types. By way of illustration, the computer terminal 120 may be configured to operate in accordance with any of a number of first, second, third, and/or fourth-generation communication protocols and/or the like. For example, the computer terminal 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The computer terminal 120 may also be configured to operate in accordance with non-cellular communication mechanisms, such as via a wireless local area network (WLAN) or other communication/data networks The user interface of the computer terminal 120 may include user input devices 240 and user output devices 286, as illustrated by FIG. 2. The user interface of the computer terminal 120 is typically configured to facilitate the interactive sessions with the user. The user output devices 286 typically include a display 280 (e.g., a liquid crystal display, a touchscreen display, and/or the like) which is operatively coupled to the processing device 210. In some embodiments, where the computer terminal 120 requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the computer terminal 120 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the computer terminal 120.

As illustrated by FIG. 2, the computer terminal may further comprise an image capture device 250. The image capture device 250 typically comprises cameras and other audio, video and image capture devices. The image capture device 250 is configured to capture images and/or video streams, typically in real-time, of a predetermined proximity area in the vicinity of the computer terminal 120 location. The images and/or video streams may be analyzed by the computer terminal 120 to determine the presence and position of the user, other individuals or objects and their movement in the proximity area, to identify the user for authentication or facial recognition purposes, and the like. In some embodiments, the system is configured to present a customized interface for the user based on identifying the user using facial recognition.

In some embodiments, the computer terminal further comprises sensor devices 290. In some embodiments, the processor 210 communicates with, transmits instructions, and/or receives signals from the sensor devices 290, in real-time for detecting the presence of the users or other individuals, determining user location, capturing authentication credentials for the user, determining parameters associated with the user, determining trigger events, capturing one or more parameters associated with the environment or physical location of the computer terminal 120, and the like. These sensor devices 112 may be contact type sensors that determine the presence of the user or object based on contact, or non-contact type sensors that detect distant users or objects. In some embodiments, the sensor devices 290 of the computer terminal are similar to the sensor devices 112 described previously, for determining the absolute or relative position, location, and proximity of the user, other individuals, or predetermined objects (such as vehicles, and vehicle features like contours of windows), within a predetermined proximity area. For example, the sensor devices 290 may comprise ultrasonic sensors, optical sensors, photoelectric sensors, capacitance sensors, inductive proximity/position sensors, visual capture devices (as described with respect to image/visual capture devices 114 and 250), and the associated transducers, transmitter and modulators, described in detail previously.

In some instances, the sensor devices 290 comprise biometric sensors for capturing parameters associated with the user, such as fingerprint scanners, voice recognition sensors, facial recognition sensors, user stress level sensors and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 3:
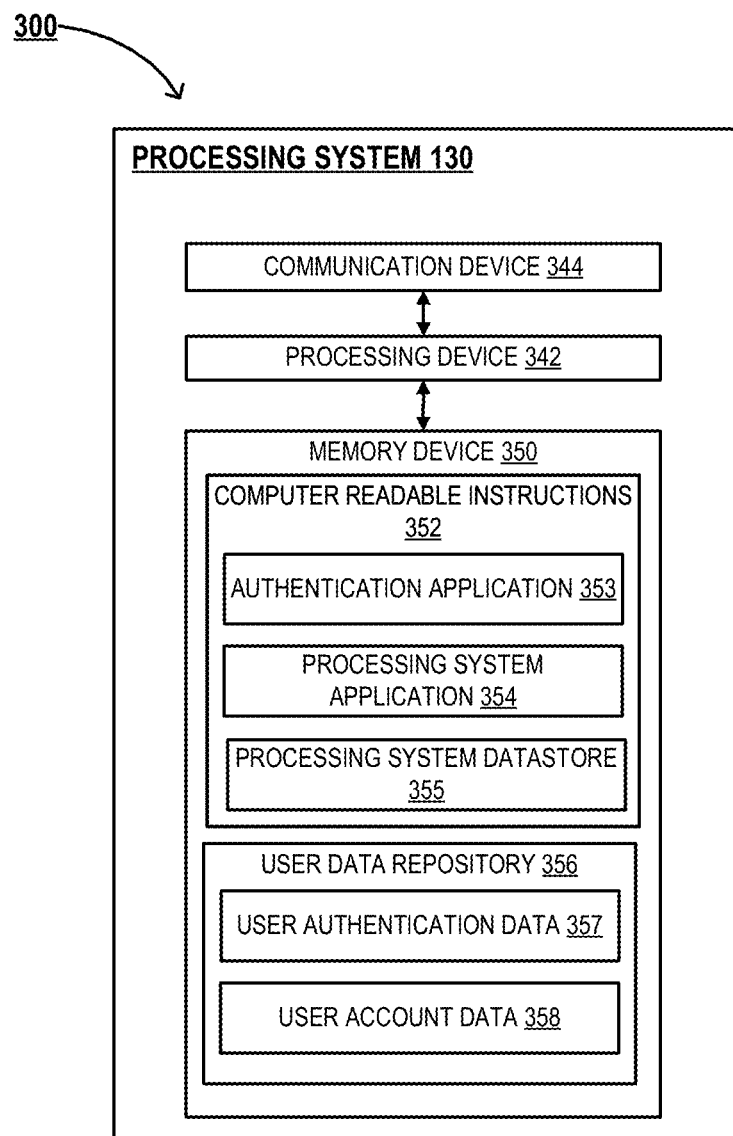
FIG. 3 illustrates a block diagram 300 of a processing system, in accordance with some embodiments of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 is typically configured to control and cause the processing device 210 of the computer terminal 120, the sensor devices 112, and visual capture devices 114, to perform one or more functions. In some embodiments, the authentication application 353 and/or the processing system application 354 comprises computer readable instructions that when executed by the processing device 342 cause the processing device 342 to perform one or more functions and/or transmit control instructions to the computer terminal 120, the authentication database 118, the third party system 116, the sensor devices 112, and visual capture devices 114, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously. The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 130, the sensor devices 112, and visual capture devices 114, other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104 or the display device 280 of the computer terminal 120. As another example, the user interface may be provided on the computer terminal 120 that may be controlled by the processing system 130 either directly or via the processing device 210 of the computer terminal 120.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity 116 to interact with the computer terminal 120, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
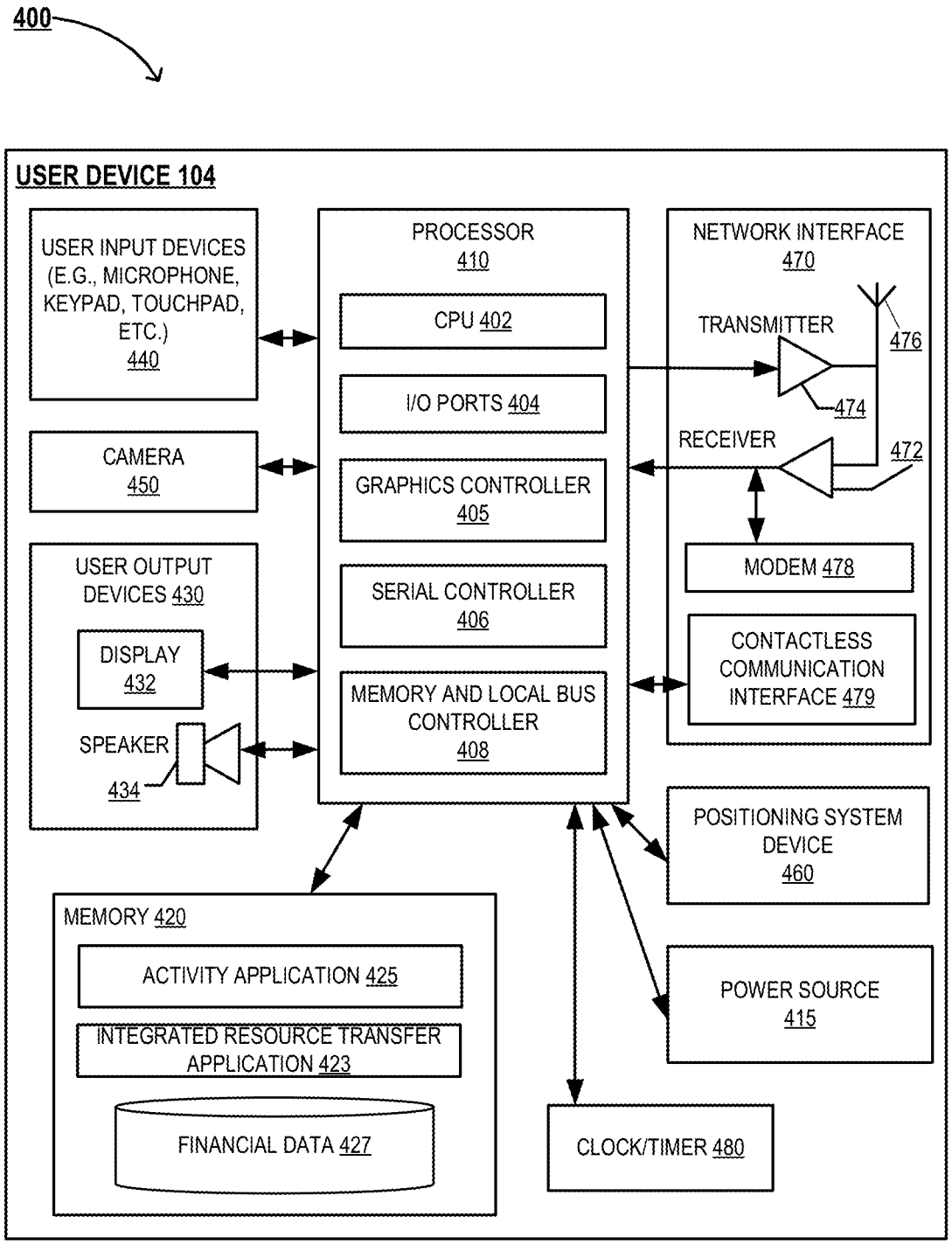
FIG. 4 illustrates a block diagram 400 of a user device, in accordance with some embodiments of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a integrated resource transfer application 423, or a web browser application. The activity application 425 may then allow the mobile device 104 to transmit and receive data and instructions from the computer terminal 120 (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The integrated resource transfer application 423 and the financial data module 427, together may include the necessary circuitry to provide token storage and transmission functionality, transmitter device signal encoding and decoding functionality to the mobile device 104, for secure transmission of financial and authentication credential tokens via the contactless communication interface 479 to the computer terminal 120. That said, in some embodiments the integrated resource transfer application 423 is pre-installed on the user device 104, while in other embodiments, the terminal 120 may transmit and cause installation of the application 423 based on determining that the user device 104 does not comprise the application 423, when the user device is within a pre-determined distance from the terminal 120.

The processor 410 may be configured to use the network interface device 470 to communicate with one or more other devices on a network 101 such as, but not limited to the computer terminal 120 and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the computer terminal 120 performing one or more steps described herein in conjunction with other devices and systems, either automatically based on executing computer readable instructions of the memory device 230, or in response to receiving control instructions from the processing system 103. In some instances, the system refers to the processing system 103. In some instances, the system refers to the devices and systems on the network environment 100 of FIG. 1. In some instances, the system refers to the mobile device 104. The features and functions of various embodiments of the invention are be described below in further detail.

Figure 5:
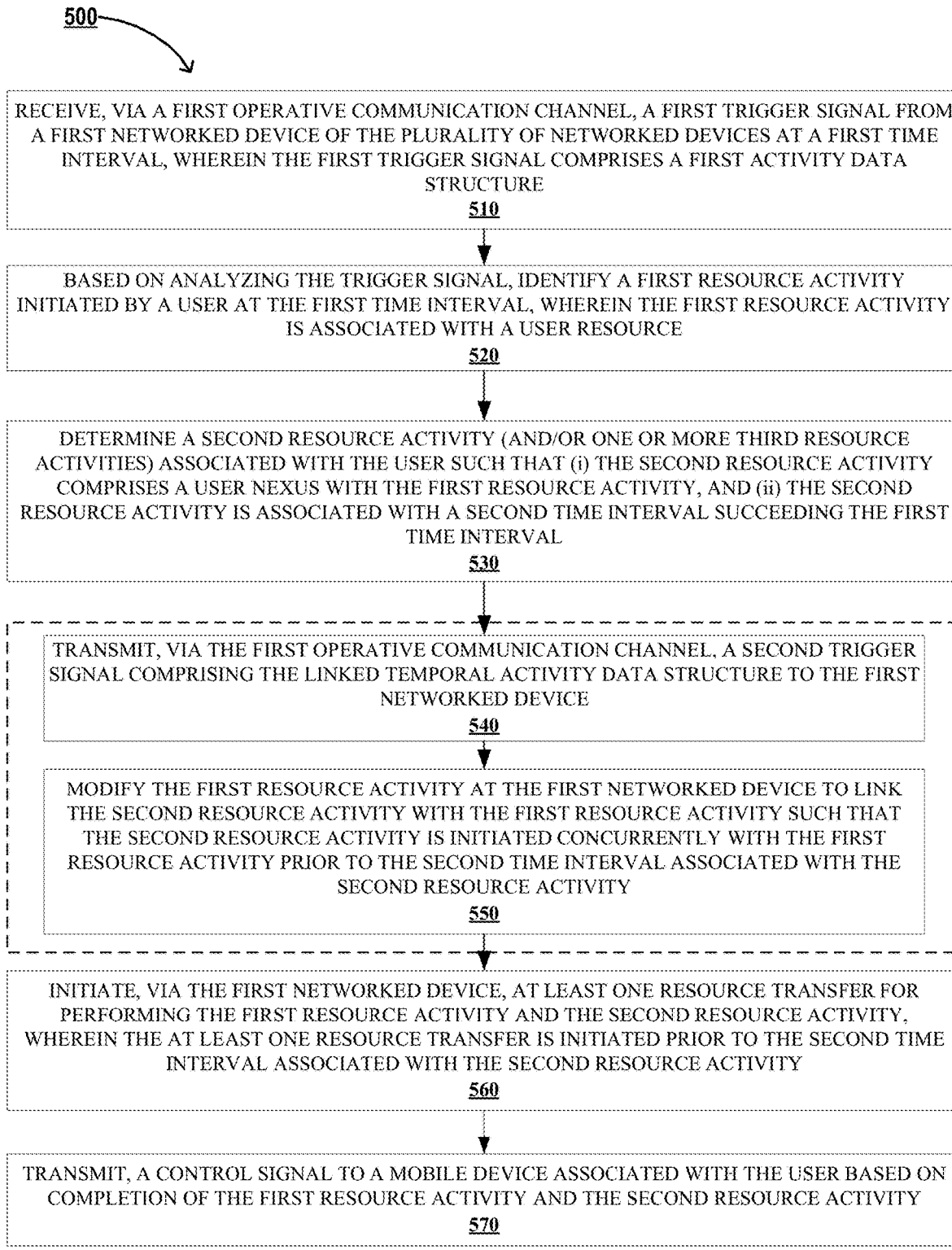
FIG. 5 illustrates a high level process flow 500 for combination of temporal resource activity data and resource transmission, in accordance with some embodiments of the invention.

FIG. 5 illustrates a high level process flow 500 for combination of temporal resource activity data and resource transmission, in accordance with some embodiments of the invention. As discussed previously, a user is typically associated with a mobile device (e.g., mobile device 104). As alluded to previously, the functionality of a computer terminal (first network device) of the present invention is fundamentally transformed herein to combine disparate activities and process them together, without requiring initiating of separate activities, which would not be possible in the absence of the invention. Specifically, the invention is configured to concatenate time dependent sequential activity data structures such that resource transmission for an impending resource activity may be performed at an antecedent resource activity associated with the sequential activity data structures.

As alluded to previously, activities may be initiated by a networked device. However, in conventional systems, once initiated, the data structures of the activity cannot be modified. For example, a first resource transfer (e.g., transaction, payment, etc.) may be initiated at a networked device (e.g., ATM, point of sale terminal, etc.) by a user. The first resource transfer is processed by transmitting data structures corresponding to a first resource value (e.g., a payment) from a first resource (e.g., an account associated with the user) to a second resource (e.g., an account associated with another entity such as a merchant). Once the first resource transfer is initiated in conventional systems, it typically cannot be modified in situ. As another example, a user may initiate an activity of a video conference. The conference is commenced by first creating data structures corresponding to the communication and access configuration resources (e.g., permissions) of the video conference, and transmitting them to one or more other networked devices associated with the participants of the video conference, after which the creating data structures corresponding to the communication and access configurations (e.g., permissions) of the video conference typically cannot be modified without interrupting the conference set-up process. Here, any alteration to the initiated user activity, even if possible, may require abandoning the already initiated activity and initiating yet another activity. For example, conventional systems may need to abandon the existing resource transfer and initiate a new resource transfer (e.g., new payment transfer, new video conference, etc.). Sudden abandoning of the initiated activities may cause systems to freeze resulting in undesirable downtime. Moreover, this requires increased processing capacity and may be detrimental to communication speeds due to the additional number of activities required to be initiated in place of the abandoned activities. Moreover, conventional systems lack the ability to proactively combine disparate activities, much less activities that are associated with distinct time intervals, hence further requiring an increased number of activities to be processed and transmitted which in turn requires even more processing and communication capability. A needs exists for systems and methods for improving the functionality and processing capability of networked devices for dynamically performing activities.

The present invention addresses the foregoing needs and also provides improvement to technology by improving the functionality of and processing capability of networked devices, by configuring the networked devices for proactive combination of temporal resource activity data and dynamic transmission of resources. The present invention provides a first improvement to conventional systems by configuring networked devices to dynamically modify initiated user activities, without requiring abandonment of the initiated activity. As a second improvement, upon initiation of a first activity, the present invention is structured to proactively, and in real time, (i) determine a second activity (also referred to as an auxiliary activity) associated with the first activity, and (ii) dynamically modify the first activity to link the second activity therewith such that the first activity and second activity are processed together, which is typically not possible in the absence of the present invention. As a third improvement provided by the present invention, the present invention is not only configured to dynamically modify an initiated first activity by concatenating/linking it with an associated second activity, the present invention is also structured to dynamically modify the initiated first activity using a time dependent second activity, such that an impending second resource activity associated with (e.g., scheduled for) a predetermined time in the future may still be concatenated/linked with the first activity occurring in the present.

For example, the system may determine that the user has initiated a first resource activity of a purchase transaction at a point of sale terminal (first networked device) associated with a first entity (e.g., first store). Here, the system may, dynamically and in real-time, modify the purchase transaction at the first networked device, in order to link a second resource activity associated with a second entity that is associated with a time in the future, such as initiating a transportation for the user such as a cab with the transportation scheduled to account after a predetermined time interval, purchase of a food item from a second entity (e.g., second store) scheduled for pick-up at a time interval in the future, such that the user can pay for both the first and second activities together at the point of sale terminal in an antecedent matter (e.g., beforehand), e.g., based on receiving user approval.

As another example, the system may determine that the user seeks to visit a sporting event based on a first activity trigger signal of purchase of entry tickets. Here, the system may analyze the first activity information included in the trigger signal such as the time and location of the event, distance from user's residence/work location, etc., and subsequently determine that the user would need to perform a second/auxiliary activity of purchasing a parking ticket for parking the user's vehicle at the time of the event. The system may automatically and dynamically modify the first activity to include the second activity, and process both of them.

As another example, as discussed above, based on determining that the user has initiated a first activity of a video conference, the system may identify an additional second/auxiliary activity of configuring network devices of the participants (e.g., user laptop computers), such that the network devices of the participants activate predetermined audio/video connectivity (e.g., activate display of predetermined interfaces (e.g., slideshows), activate screen sharing, mute speakers, etc.) after a certain time interval after the video conference has commenced. The system may then dynamically modify the data structures corresponding to the communication and access configuration resources of the video conference to include that of the second activity, and transmit them to one or more other networked devices associated with the participants of the video conference.

These features will now be described in detail with respect to the process flow 500 of FIG. 5. As indicated by block 510, in some instances, the system (e.g., processing system 103, the computer terminal 120 and/or the mobile device 104) receives a first trigger signal from a first networked device of a plurality of networked devices at a first time interval. Typically, the system, for example, via a communication device of the system, is configured to establish operative communication with a plurality of networked devices via an electronic communication network (e.g., network 101). The plurality of networked devices (e.g., the first networked device) may include one or more of mobile devices associated with users (e.g., mobile device 104, and/or positioning system device 460 of the mobile device), the computer terminals (e.g., computer terminal 120), sensor devices (e.g., sensor devices 112), one or more visual capture devices (e.g., devices 114), proximity sensors and position sensors described previously, and/or the like. In some embodiments, the first trigger signal comprises a first activity data structure comprises a first activity data structure constructed by the first networked device. In some embodiments, the first trigger signal comprises a first activity data structure comprises at least one of a user input provided at the mobile device and/or the first networked device. In other instances, the system may receive a trigger signal from a smart device, such as a smart car, a smart door, or a smart television, indicating that the user has performed one or more predetermined activities associated with the smart device, based on prior user permissions and settings. In yet other instances, the trigger signal comprising a user geographic location signal is received from a positioning device of the mobile device (e.g., positioning system device 460 of the mobile device) when the user location coordinates are associated with a predetermined location or area or within a predetermined proximity of another device. In some embodiments, the system may identify the trigger signal based on analyzing user calendar data received from a calendar application stored on the mobile device. In some embodiments, the trigger signal may be received from an external system (e.g., social networking systems, merchant systems, and the like). In some embodiments, the trigger signal is transmitted by the proximity transmitter device when the user is within a predetermined proximity of the proximity transmitter device (e.g., proximity sensors and position sensors described previously). In some embodiments, the trigger signal is typically received in real time or near-real time of the user seeking to initiate a network activity. In some embodiments, the trigger signal comprises activity data associated with the user. The activity data may comprise user information, user resource (account) information, device location, time period, user preferences, user permissions, and/or other information relevant to the network activity that the user seeks to perform.

Next, as indicated by block 520, based on analyzing the first trigger signal, the system is configured to identify a first resource activity initiated by a user at the first time interval. Typically, the network activity is associated with a user resource. For example, based on receiving a trigger signal indicating a request for transmission of a resource value from a merchant, the system may determine that the user has initiated a transaction at a merchant. As another example, the system may determine that the user seeks to visit a sporting event based on a first activity trigger signal of purchase of entry tickets. As yet another example, the system may analyze a first trigger signal from a communication component/device of a user device and determine that the user has initiated a first activity of a video conference with a plurality of auxiliary users associated with respective devices.

As indicated by block 530, the system may identify a secondary activity that the user may be required to or may seek to perform subsequently/at an upcoming time. Specifically, the system may determine a second resource activity associated with the user such that (i) the second resource activity comprises a user *nexus* with the first resource activity, and (ii) the second resource activity is associated with a second time interval succeeding the first time interval. Determining a "user *nexus*" between the first resource activity and the second resource activity may refer to determining/constructing/detecting a relationship, an overlap, a commonality, etc., e.g., between otherwise temporally disparate first and second resource activities. In some instances, the system may determine a "user *nexus*" between the first resource activity and the second resource activity based on a relationship, an overlap, a commonality, etc., between technical characteristics of the first and second resource activities, such as activity type information, temporal activity information, positional/geographic information, prior activity performance information, and/or future activity schedule information, etc., as will be described in detail below.

In some embodiments, for determining the user *nexus*, the system may first analyze a prior user activity log associated with the user. The system may parse prior user activity data of numerous prior activities. The system may then identify a prior first resource activity associated with the first networked device in the user activity log, that is substantially similar to the current first resource activity. For example, for a current first resource activity of the purchasing tickets to a sporting event, the system may identify a prior first resource activity previously conducted by the user of purchase of tickets for a musical event at a prior date/time A. The system may further identify a prior second resource activity (and/or one or more prior third resource activities) associated from the user activity log. Continuing with the previous example, the system may identify and parse through prior user activities that occurred after the prior first resource activity for a predetermined time interval succeeding the prior first activity. Here, the system may identify that the musical event occurred at a prior date/time B succeeding date/time A, and determine the predetermined time interval to be the time period between the data/time A and date/time B, and analyze activities conducted by the user therein. The system typically (i) selects the prior second resource activity (and/or one or more prior third resource activities) as the second resource activity (and/or one or more third resource activities), and (ii) determines that the second resource activity (and/or one or more third resource activities) comprises the user *nexus* with the first resource activity. Continuing with the previous example, the system may identify a prior second activity that the user previously purchased parking tickets a date/time between times A and B, for parking a geographic location at the event. In response to determining that the prior first activity and the currently being analyzed first resource activity are both resource type events, the system may determine a second resource activity of purchasing parking tickets as well. The system may further customize the second resource activity of purchasing parking tickets to the location and time of the currently being analyzed first resource activity. Here, the second activity data structure of the second activity is constructed such that parking tickets are obtained for a time (i.e., the second time interval) and a location corresponding to the event of the first resource activity.

In some embodiments, alone or in combination with the previous embodiments, for determining the user *nexus*, the system may first determine a geographic location of the first networked device, using positioning devices are described previously. The system may then construct a geofence associated with the geographic location of the first networked device, wherein the geofence is associated with a geographic area within a predetermined distance range from the geographic location of the first networked device. The system may identify a second resource activity (and/or one or more third resource activities) associated with the user (e.g., based on scheduled user activities, prior user activities as described above, etc.). In response to at least determining that a geographic location of the second resource activity is within the geofence, the system may determine that the second resource activity (and/or one or more third resource activities) comprises the user *nexus* with the first resource activity. For example, the system may determine that the user has initiated a first resource activity of a purchase transaction at a point of sale terminal (first networked device) associated with a first entity (e.g., first store) located at a first location (e.g., GPS coordinates, zip code, etc.). Here, the system may determine a second resource activity associated with a second entity for the user within a predetermined geographic proximity of the first activity (e.g., within the same zip code, within a 1-mile radius, within predetermined walkable distance, etc.), the second resource activity being associated with a time in the future (e.g. within 5-10 minutes or 10-15 minutes succeeding the first resource activity). Here, the second resource activity may comprise initiating a transportation for the user such as a cab from the location of the first resource activity, purchase of a food item from a second entity (e.g., second store) within a predetermined geographic proximity of the location of the first activity and scheduled for pick-up at a time interval in the future (e.g., within a time interval associated with the user commuting between the locations of the first activity and the second activity within the geographic fence), etc.

In some embodiments, alone or in combination with the previous embodiments, for determining the user *nexus*, the system may first identify a future scheduled activity associated with the user. In response to at least determining that the future scheduled activity is scheduled for a time within a predetermined time interval from the first resource activity, the system may (i) select the future scheduled activity as the second resource activity (and/or one or more third resource activities), and (ii) determine that the second resource activity (and/or one or more third resource activities) comprises the user *nexus* with the first resource activity. As an example, as discussed above, based on determining that the user has initiated a first activity of a video conference, the system may identify a future scheduled activity of configuring network devices of the participants (e.g., user laptop computers), such that the network devices of the participants activate predetermined audio/video connectivity (e.g., activate display of predetermined interfaces (e.g., slideshows), activate screen sharing, mute speakers, etc.), as the second resource activity, with the user *nexus* being that both the activities are associated with the same video conference.

In some embodiments, for determining that the second resource activity associated with the user, the system may first determine an activity entity system associated with the second resource activity. The system may further determine, via operative communication with the activity entity system, an activity availability and an activity resource value associated with the second activity data. Finally, the system may determine that (i) the activity availability is above a predetermined threshold (e.g., the items, resources, services, etc. associated with the second activity are available for the time required an in the quantity required), and (ii) the activity resource value is below a resource availability value associated with the user (e.g., the resource value (e.g., cost/ amount) of the items, resources, services, etc. associated with the second activity is below resources available to the user (e.g., available budget amount of the user)). Typically, the second activity data structure associated with the second resource activity comprises the activity resource value.

In response to identifying a secondary activity that the user may be required to or may seek to perform subsequently/at an upcoming time with a user *nexus* to the first resource activity, the system may then construct a second activity data structure associated with the second resource activity associated with the second time interval. The second activity data structure may be substantially similar to the first activity data structure. The second activity data structure may comprise (i) technical activity characteristics (e.g., devices involved, communication protocols, resources involved, resource values to be transferred, entity identifiers, unique identifier of the resource activity, time interval for conducting the resource activity etc.) and/or instructions for executing/conducting the resource activity (e.g., authorization/authentication requirements, etc.). As an example, as discussed above, based on determining that the user has initiated a first activity of a video conference, the system may identify an additional second/auxiliary activity of configuring network devices of the participants (e.g., user laptop computers), such that the network devices of the participants activate predetermined audio/video connectivity (e.g., activate display of predetermined interfaces (e.g., slideshows), activate screen sharing, mute speakers, etc.) after a certain time interval after the video conference has commenced. The system may then dynamically construct a second activity data structure corresponding to the communication and access configuration resources of the video conference to include that of the second activity.

Subsequently, the system may construct a linked temporal activity data structure comprising the second activity data structure linked with the first activity data structure of the first resource activity. Here, linking the activity data structures is structured to cause both of the activities to be processed together. It is noted that, the second activity and secondary activity may refer to multiple additional activities. For example, the system may determine one or more third activities that the user may be required to or seek to perform. Here, the system may determine one or more third resource activities associated with the user such that (i) each of the one or more third resource activities comprises a user *nexus* with the first resource activity, and (ii) each of the one or more third resource activities is associated with a third time interval succeeding the first time interval.

At block 540, the system may then transmit via the first operative communication channel, a second trigger signal comprising the linked temporal activity data structure to the first networked device. In the embodiments where the system also identifies one or more third resource activities, the system may also construct, for the one or more third resource activities, one or more third activity data structures. Moreover, the system may construct the linked temporal activity data structure such that (i) the second activity data structure and (ii) the one or more third activity data structures are linked with (iii) the first activity data structure. For the example of the first activity of a video conference and a second activity of configuring network devices of the participants (e.g., user laptop computers), the system may then link the data structures corresponding to the first and second activities) and transmit them to one or more other networked devices associated with the participants of the video conference, such that the network devices of the participants activate predetermined audio/video connectivity (e.g., activate display of predetermined interfaces (e.g., slideshows), activate screen sharing, mute speakers, etc.) after a certain time interval after the video conference has commenced.

Here, as indicated by block 550, the second trigger signal is structured to modify the first resource activity at the first networked device to link the second resource activity with the first resource activity such that the second resource activity is initiated concurrently with the first resource activity prior to the second time interval associated with the second resource activity. For example, second trigger signal is structured to modify the purchase transaction at the first networked device, in order to link a second resource activity associated with a second entity that is associated with a time in the future, such as initiating a transportation for the user such as a cab with the transportation scheduled to account after a predetermined time interval, purchase of a food item from a second entity (e.g., second store) scheduled for pick-up at a time interval in the future, such that the user can pay for both the first and second activities together at the point of sale terminal in an antecedent matter (e.g., beforehand), e.g., based on receiving user approval. In the embodiments where the system also identifies one or more third resource activities, the second trigger signal is typically structured to modify the first resource activity at the first networked device to link the one or more third resource activities with the first resource activity such that each of the one or more third resource activities are initiated concurrently with the first resource activity prior to the third time interval associated with the third resource activity.

Here, in some embodiments, the system may present the linked temporal activity data structure associated with the first resource activity and the second resource activity, to the user. In this regard, the system may modify, dynamically, an existing presentation associated with the first resource activity on a display device of the first networked device by inserting a presentation associated with the second activity data structure of the second resource activity (and/or the one or more third activity data structures of the one or more third resource activities). The system may further configure the first networked device for performing the at least one resource transfer associated with the first resource activity and the second resource activity.

In this regard, the system may transmit, a third trigger signal comprising the linked temporal activity data structure to a user device associated with the user. Typically, the second trigger signal is structured to cause the user device to display a user interface associated with the first resource activity and the second resource activity (and/or one or more third resource activities). The system may then receive, via the user device, at least one user input associated with authorizing the second user activity (and/or one or more third resource activities). In response to receiving the at least one user input authorizing the second user activity, the system may transmit the second trigger signal to the first networked device.

In this regard, the system may allow the user to modify the second activity (and/or one or more third resource activities), e.g., to change one or more technical activity characteristics or parameters (such as, time, resources involved, etc.). Here, the system may receive, via the user device, a change user input associated with modifying the second user activity. In response to receiving the change user input, the system may modify the linked temporal activity data structure. Typically, the second trigger signal comprises the modified linked temporal activity data structure.

Next at block 560, the system initiates, via the first networked device, at least one resource transfer for performing the first resource activity and the second resource activity, wherein the at least one resource transfer is initiated prior to the second time interval associated with the second resource activity. In this regard, the second activity may be processed (e.g., items/resources reserved) and any associated resource transfers (e.g., payments) are completed along with that of the first resource activity, while the second activity (e.g., event, scheduled pick-up, etc.) remains scheduled for the future time. In the embodiments where the system also identifies one or more third resource activities, initiating the at least one resource transfer also comprises initiating the at least one resource transfer for performing the first resource activity, the second resource activity, and one or more third resource activities In some embodiments, the system may receive a user input associated with authorizing the second user activity at the user device. Based on at least the user input, the system may concurrently perform (i) the first resource activity and (ii) the second resource activity (and/or (iii) one or more third resource activities) at the first networked device prior to the second time interval associated with the second resource activity.

Here, in some embodiments, the at least one resource transfer comprises a first resource transfer associated with the first resource activity and a second resource transfer associated with the second resource activity. In the embodiments where the system also identifies one or more third resource activities, initiating the at least one resource transfer comprises initiating the at least one resource transfer for performing the first resource activity, the second resource activity, and one or more third resource activities. The system may further concurrently initiate (i) transmission of the first resource transfer associated with the first resource activity to a first entity resource associated with the first networked device, and (ii) transmission of the second resource transfer associated with the second resource activity to a second entity resource not associated with the first networked device, without requiring initiation of another resource activity.

In some embodiments, the system may access a mobile device security identifier stored in the user device, and validate user authentication credentials received at the user device from the user. Typically, the (i) the first resource activity and (ii) the second resource activity are performed at the first networked device based on at least (i) successful validation of the user authentication credentials and (ii) the mobile device security identifier.

Subsequently, at block 570, the system may transmit, a control signal to a mobile device associated with the user based on completion of the first resource activity and the second resource activity, e.g., in the form of a notification. In the embodiments where the system also identifies one or more third resource activities, the system may also transmit a control signal to a mobile device associated with the user based on completion of the one or more third resource activities.

In some embodiments, the system may access a mobile device security identifier stored in the mobile device, such as a secure storage location accessible only by an application associated with the present invention. In some embodiments, the secure storage location contains predetermined code, which is configured to generate a unique encoded mobile device security identifier token, every time the identifier is requested. In this regard, only secure or pre-authenticated networked devices may comprise a decoding algorithm configured for processing the encoded mobile device security identifier. Next, the system or the associated networked device (e.g., computer terminal) may validate user authentication credentials received at the mobile device from the user. Subsequently, the system may authenticate, the mobile device for performing the network activity via the channel, based on (i) successful validation of the user authentication credentials, and (ii) the mobile device security identifier. In response, the system may allow the user to perform the user activity, via the network activity channel, using the mobile device.

Alternatively or in addition to the above, the mobile device may validate security credentials received from the networked devices. Subsequently, the mobile device may authenticate the networked device prior to establishing an operative coupling of the mobile device and the networked device (e.g., computer terminal).

In some embodiments, in response to identifying a trigger signal and a time-sensitive network activity, the system may determine that the user mobile device is offline, for example, due to an existing internal process currently running (e.g., battery conservation setting). Here, the system is configured for transmitting an activation signal to the mobile device, e.g., via a data network or a text message, or via a near field communication signal from a nearby device (e.g., smart speaker or another smart device). This activation signal is configured to cause an offline mobile device to connect to the communication network (e.g., by disabling the internal process).

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for combination of temporal resource activity data and resource transmission, wherein the system is configured to concatenate time dependent sequential activity data structures such that resource transmission for an impending resource activity may be performed at an antecedent resource activity associated with the sequential activity data structures, the system comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
      receive, via a first operative communication channel, a first trigger signal from a first networked device of the plurality of networked devices at a first time interval, wherein the first trigger signal comprises a first activity data structure;
      based on analyzing the first trigger signal, identify a first resource activity initiated by a user at the first time interval, wherein the first resource activity is associated with a user resource;
      determine a second resource activity associated with the user such that (i) the second resource activity comprises a user *nexus* with the first resource activity, and (ii) the second resource activity is associated with a second time interval succeeding the first time interval;
      construct a second activity data structure associated with the second resource activity associated with the second time interval;
      construct a linked temporal activity data structure comprising the second activity data structure linked with the first activity data structure;
      transmit, via the first operative communication channel, a second trigger signal comprising the linked temporal activity data structure to the first networked device, wherein the second trigger signal is structured to modify the first resource activity at the first networked device to link the second resource activity with the first resource activity such that the second resource activity is initiated concurrently with the first resource activity prior to the second time interval associated with the second resource activity;
      initiate, via the first networked device, at least one resource transfer for performing the first resource activity and the second resource activity, wherein the at least one resource transfer is initiated prior to the second time interval associated with the second resource activity;
      transmit, a control signal to a mobile device associated with the user based on completion of the first resource activity and the second resource activity;
      determine one or more third resource activities associated with the user such that (i) each of the one or more third resource activities comprises a user *nexus* with the first resource activity, and (ii) each of the one or more third resource activities is associated with a third time interval succeeding the first time interval;
      construct, for the one or more third resource activities, one or more third activity data structures;
      wherein constructing the linked temporal activity data structure comprises the one or more third activity data structures linked with the first activity data structure;
      wherein the second trigger signal is structured to modify the first resource activity at the first networked device to link the one or more third resource activities with the first resource activity such that each of the one or more third resource activities are initiated concurrently with the first resource activity prior to the third time interval associated with the third resource activity;
      wherein initiating the at least one resource transfer comprises initiating the at least one resource transfer for performing the first resource activity, the second resource activity, and one or more third resource activities; and
      transmit, a control signal to the mobile device associated with the user based on completion of the one or more third resource activities.

2. The system of claim 1, wherein transmitting the second trigger signal to the first networked device further comprises:
   transmitting, a third trigger signal comprising the linked temporal activity data structure to a user device associated with the user, wherein the third trigger signal is structured to cause the user device to display a user interface associated with the first resource activity and the second resource activity;
   receive, via the user device, at least one user input associated with authorizing the second resource activity; and
   in response to receiving the at least one user input authorizing the second resource activity, transmitting the second trigger signal to the first networked device.

3. The system of claim 2, wherein receiving the at least one user input associated with authorizing the second resource activity:
   receiving, via the user device, a change user input associated with modifying the second resource activity; and
   in response to receiving the change user input, modify the linked temporal activity data structure; and
   wherein the second trigger signal comprises the modified linked temporal activity data structure.

4. The system of claim 1, wherein transmitting the second trigger signal to the first networked device further comprises:
   presenting the linked temporal activity data structure associated with the first resource activity and the second resource activity, comprising:
      modifying, dynamically, an existing presentation associated with the first resource activity on a display device of the first networked device by inserting a presentation associated with the second activity data structure of the second resource activity; and
      configuring the first networked device for performing the at least one resource transfer associated with the first resource activity and the second resource activity.

5. The system of claim 1, wherein determining that the second resource activity comprises the user *nexus* with the first resource activity further comprises:
   determining a geographic location of the first networked device;
   constructing a geofence associated with the geographic location of the first networked device, wherein the geofence is associated with a geographic area within a predetermined distance range from the geographic location of the first networked device;

identifying a second resource activity associated with the user; and in response to at least determining that a geographic location of the second resource activity is within the geofence, determining that the second resource activity comprises the user *nexus* with the first resource activity.

6. The system of claim 1, wherein determining that the second resource activity comprises the user *nexus* with the first resource activity further comprises:

analyzing a prior user activity log associated with the user;

identifying a prior first resource activity associated with the first networked device in the prior user activity log;

identifying a prior second resource activity associated from the prior user activity log; and in response to at least determining that the prior second resource activity occurred at a time within a predetermined time interval from the prior first resource activity, (i) selecting the prior second resource activity as the second resource activity, and (ii) determining that the second resource activity comprises the user *nexus* with the first resource activity.

7. The system of claim 1, wherein determining that the second resource activity comprises the user *nexus* with the first resource activity further comprises:

identifying a future scheduled activity associated with the user; and in response to at least determining that the future scheduled activity is scheduled for a time within a predetermined time interval from the first resource activity, (i) selecting the future scheduled activity as the second resource activity, and (ii) determining that the second resource activity comprises the user *nexus* with the first resource activity.

8. The system of claim 1, wherein determining the second resource activity associated with the user further comprises:

determining an activity entity system associated with the second resource activity;

determining, via operative communication with the activity entity system, an activity availability and an activity resource value associated with the second activity data structure;

determining that (i) the activity availability is above a predetermined threshold, and (ii) the activity resource value is below a resource availability value associated with the user; and wherein the second activity data structure associated with the second resource activity comprises the activity resource value.

9. The system of claim 1, wherein the processing device is configured to execute the computer-readable program code to:

receive a user input associated with authorizing the second resource activity at the mobile device; and based on at least the user input, concurrently perform (i) the first resource activity and (ii) the second resource activity at the first networked device prior to the second time interval associated with the second resource activity.

10. The system of claim 9, wherein the at least one resource transfer comprises a first resource transfer associated with the first resource activity and a second resource transfer associated with the second resource activity, and wherein performing (i) the first resource activity and (ii) the second resource activity comprises:

initiating, concurrently, (i) transmission of the first resource transfer associated with the first resource activity to a first entity resource associated with the first networked device, and (ii) transmission of the second resource transfer associated with the second resource activity to a second entity resource not associated with the first networked device, without requiring initiation of another resource activity.

11. The system of claim 9, wherein receiving the user input associated with authorizing the second resource activity further comprises:

accessing a mobile device security identifier stored in the mobile device;

validating user authentication credentials received at the mobile device from the user; and wherein the (i) the first resource activity and (ii) the second resource activity are performed at the first networked device based on at least (i) successful validation of the user authentication credentials and (ii) the mobile device security identifier.

12. The system of claim 1, wherein the first networked device is a transaction terminal.

13. A computer program product for combination of temporal resource activity data and resource transmission, wherein the computer program product, when implemented by a processor is configured to concatenate time dependent sequential activity data structures such that resource transmission for an impending resource activity may be performed at an antecedent resource activity associated with the sequential activity data structures, wherein the computer program product comprises at least one non-transitory computer-readable medium having computer-readable program code portions embodied therein, the computer-readable program code portions which when executed by a processing device are configured to cause the processor to:

receive, via a first operative communication channel, a first trigger signal from a first networked device of a plurality of networked devices at a first time interval, wherein the first trigger signal comprises a first activity data structure;

based on analyzing the first trigger signal, identify a first resource activity initiated by a user at the first time interval, wherein the first resource activity is associated with a user resource;

determine a second resource activity associated with the user such that (i) the second resource activity comprises a user *nexus* with the first resource activity, and (ii) the second resource activity is associated with a second time interval succeeding the first time interval;

construct a second activity data structure associated with the second resource activity associated with the second time interval;

construct a linked temporal activity data structure comprising the second activity data structure linked with the first activity data structure;

transmit, via the first operative communication channel, a second trigger signal comprising the linked temporal activity data structure to the first networked device, wherein the second trigger signal is structured to modify the first resource activity at the first networked device to link the second resource activity with the first resource activity such that the second resource activity is initiated concurrently with the first resource activity prior to the second time interval associated with the second resource activity;

initiate, via the first networked device, at least one resource transfer for performing the first resource activity and the second resource activity, wherein the at least one resource transfer is initiated prior to the second time interval associated with the second resource activity;

transmit, a control signal to a mobile device associated with the user based on completion of the first resource activity and the second resource activity;

determine one or more third resource activities associated with the user such that (i) each of the one or more third resource activities comprises a user *nexus* with the first resource activity, and (ii) each of the one or more third resource activities is associated with a third time interval succeeding the first time interval;

construct, for the one or more third resource activities, one or more third activity data structures;

wherein constructing the linked temporal activity data structure comprises the one or more third activity data structures linked with the first activity data structure;

wherein the second trigger signal is structured to modify the first resource activity at the first networked device to link the one or more third resource activities with the first resource activity such that each of the one or more third resource activities are initiated concurrently with the first resource activity prior to the third time interval associated with the third resource activity;

wherein initiating the at least one resource transfer comprises initiating the at least one resource transfer for performing the first resource activity, the second resource activity, and one or more third resource activities; and transmit, a control signal to the mobile device associated with the user based on completion of the one or more third resource activities.

14. The computer program product of claim 13, wherein transmitting the second trigger signal to the first networked device further comprises:

transmitting, a third trigger signal comprising the linked temporal activity data structure to a user device associated with the user, wherein the third trigger signal is structured to cause the user device to display a user interface associated with the first resource activity and the second resource activity;

receive, via the user device, at least one user input associated with authorizing the second resource activity; and in response to receiving the at least one user input authorizing the second resource activity, transmitting the second trigger signal to the first networked device.

15. The computer program product of claim 13, wherein transmitting the second trigger signal to the first networked device further comprises:

presenting the linked temporal activity data structure associated with the first resource activity and the second resource activity, comprising:

modifying, dynamically, an existing presentation associated with the first resource activity on a display device of the first networked device by inserting a presentation associated with the second activity data structure of the second resource activity; and configuring the first networked device for performing the at least one resource transfer associated with the first resource activity and the second resource activity.

16. The computer program product of claim 13, wherein determining that the second resource activity comprises the user *nexus* with the first resource activity further comprises:

analyzing a prior user activity log associated with the user;

identifying a prior first resource activity associated with the first networked device in the prior user activity log;

identifying a prior second resource activity associated from the prior user activity log; and in response to at least determining that the prior second resource activity occurred at a time within a predetermined time interval from the prior first resource activity, (i) selecting the prior second resource activity as the second resource activity, and (ii) determining that the second resource activity comprises the user *nexus* with the first resource activity.

17. A computer-implemented method for combination of temporal resource activity data and resource transmission, wherein the method is configured to concatenate time dependent sequential activity data structures such that resource transmission for an impending resource activity may be performed at an antecedent resource activity associated with the sequential activity data structures, the computer-implemented method comprising:

receiving, via a first operative communication channel, a first trigger signal from a first networked device of a plurality of networked devices at a first time interval, wherein the first trigger signal comprises a first activity data structure;

based on analyzing the first trigger signal, identifying a first resource activity initiated by a user at the first time interval, wherein the first resource activity is associated with a user resource;

determining a second resource activity associated with the user such that (i) the second resource activity comprises a user *nexus* with the first resource activity, and (ii) the second resource activity is associated with a second time interval succeeding the first time interval;

constructing a second activity data structure associated with the second resource activity associated with the second time interval;

constructing a linked temporal activity data structure comprising the second activity data structure linked with the first activity data structure;

transmitting, via the first operative communication channel, a second trigger signal comprising the linked temporal activity data structure to the first networked device, wherein the second trigger signal is structured to modify the first resource activity at the first networked device to link the second resource activity with the first resource activity such that the second resource activity is initiated concurrently with the first resource activity prior to the second time interval associated with the second resource activity;

initiating, via the first networked device, at least one resource transfer for performing the first resource activity and the second resource activity, wherein the at least one resource transfer is initiated prior to the second time interval associated with the second resource activity;

transmitting, a control signal to a mobile device associated with the user based on completion of the first resource activity and the second resource activity;

determine one or more third resource activities associated with the user such that (i) each of the one or more third resource activities comprises a user *nexus* with the first resource activity, and (ii) each of the one or more third resource activities is associated with a third time interval succeeding the first time interval;

construct, for the one or more third resource activities, one or more third activity data structures;

wherein constructing the linked temporal activity data structure comprises the one or more third activity data structures linked with the first activity data structure;

wherein the second trigger signal is structured to modify the first resource activity at the first networked device to link the one or more third resource activities with the first resource activity such that each of the one or more third resource activities are initiated concurrently with the first resource activity prior to the third time interval associated with the third resource activity;

wherein initiating the at least one resource transfer comprises initiating the at least one resource transfer for performing the first resource activity, the second resource activity, and one or more third resource activities; and transmit, a control signal to the mobile device associated with the user based on completion of the one or more third resource activities.

18. The computer-implemented method of claim 17, wherein transmitting the second trigger signal to the first networked device further comprises:

transmitting, a third trigger signal comprising the linked temporal activity data structure to a user device associated with the user, wherein the third trigger signal is structured to cause the user device to display a user interface associated with the first resource activity and the second resource activity;

receive, via the user device, at least one user input associated with authorizing the second user activity; and in response to receiving the at least one user input authorizing the second user activity, transmitting the second trigger signal to the first networked device.

19. The computer-implemented method of claim 17, wherein transmitting the second trigger signal to the first networked device further comprises:

presenting the linked temporal activity data structure associated with the first resource activity and the second resource activity, comprising:

modifying, dynamically, an existing presentation associated with the first resource activity on a display device of the first networked device by inserting a presentation associated with the second activity data structure of the second resource activity; and configuring the first networked device for performing the at least one resource transfer associated with the first resource activity and the second resource activity.

* * * * *